United States Patent
Xu et al.

(10) Patent No.: US 11,645,784 B1
(45) Date of Patent: May 9, 2023

(54) TECHNIQUES FOR DETECTING AND CLASSIFYING RELEVANT CHANGES

(71) Applicant: Bentley Systems, Incorporated, Exton, PA (US)

(72) Inventors: Christian Xu, Paris (FR); Renaud Keriven, Fontenay sous Bois (FR)

(73) Assignee: Bentley Systems, Incorporated, Exton, PA (US)

( * ) Notice: Subject to any disclaimer, the term of this patent is extended or adjusted under 35 U.S.C. 154(b) by 119 days.

(21) Appl. No.: 17/394,644

(22) Filed: Aug. 5, 2021

(51) Int. Cl.
*G06T 7/90* (2017.01)
*G06T 17/00* (2006.01)
*G06T 7/00* (2017.01)
*G06T 19/00* (2011.01)
*G06N 5/04* (2023.01)
*G06F 18/21* (2023.01)
(Continued)

(52) U.S. Cl.
CPC ............... *G06T 7/97* (2017.01); *G06F 18/21* (2023.01); *G06F 18/24* (2023.01); *G06F 18/253* (2023.01); *G06N 5/04* (2013.01); *G06T 17/00* (2013.01); *G06T 19/00* (2013.01); *G06T 2207/10028* (2013.01); *G06T 2207/20081* (2013.01); *G06T 2207/20084* (2013.01); *G06T 2207/30184* (2013.01); *G06T 2210/56* (2013.01)

(58) Field of Classification Search
CPC ........... G06T 7/97; G06T 17/00; G06T 19/00; G06T 2207/10028; G06T 2207/20081; G06T 2207/20084; G06T 2207/30184; G06T 2210/56; G06F 18/21; G06F 18/24; G06F 18/253; G06N 5/04
See application file for complete search history.

(56) References Cited

U.S. PATENT DOCUMENTS 9,619,691 B2   4/2017   Pang et al.
2019/0147302 A1*   5/2019   Jampani ........... G06V 30/19173
                                                         382/156

(Continued)

OTHER PUBLICATIONS

Su, Hang, et al. "Splatnet: Sparse lattice networks for point cloud processing." Proceedings of the IEEE conference on computer vision and pattern recognition. 2018. (Year: 2018).*

(Continued)

*Primary Examiner* — Saptarshi Mazumder
(74) *Attorney, Agent, or Firm* — Cesari and McKenna, LLP; James A. Blanchette

(57) ABSTRACT

In various example embodiments, relevant changes between 3D models of a scene are detected and classified by transforming the 3D models into point clouds and applying a deep learning model to the point clouds. The model may employ a Siamese arrangement of sparse lattice networks each including a number of modified BCLs. The sparse lattice networks may each take a point cloud as input and extract features in 3D space to provide a primary output with features in 3D space and an intermediate output with features in lattice space. The intermediate output from both sparse lattice networks may be compared using a lattice convolution layer. The results may be projected into the 3D space of the point clouds using a slice process and concatenated to the primary io outputs of the sparse lattice networks. Each concatenated output may be subject to a convolutional network to detect and classify relevant changes.

20 Claims, 8 Drawing Sheets

(51) Int. Cl.
G06F 18/24 (2023.01)
G06F 18/25 (2023.01)

(56) References Cited

U.S. PATENT DOCUMENTS

2021/0201526 A1* 7/2021 Moloney ............... G06N 3/084
2022/0121784 A1 4/2022 Demchak et al.

OTHER PUBLICATIONS

Varghese, Ashley, et al. "ChangeNet: Adeep learning architecture for visual change detection." Proceedings of the European conference on computer vision (ECCV) workshops. 2018. (Year: 2018).*
Awrangjeb, Mohammad, et al., "Building Change Detection from Lidar Point Cloud Data Based on Connected Component Analysis," ISPRS Annals of the Photogrammetry, Remote Sensing and Spatial Information Sciences, vol. II-3/W5, 2015 ISPRS Geospatial Week 2015, La Grande Motte, France, Sep. 28-Oct. 3, 2015, pp. 393-400.
Cao, Cong, et al., "Land-Use Change Detection with Convolutional Neural Network Methods," MDPI, Environments, vol. 6, No. 25, Feb. 24, 2019, pp. 1-15.
Chen, Long, et al., "SCA-CNN: Spatial and Channel-wise Attention in Convolutional Networks for Image Captioning," IEEE, CVF, Computer Vision Foundation, CVPR, 2017 IEEE Conference on Computer Vision and Pattern Recognition (CVPR), Honolulu, HI, USA, Jul. 21-26, 2017, pp. 5659-5667.
Daudt, Rodrigo Caye, et et., "Fully Convolutional Siamese Networks for Change Detection," arXiv, arXiv: 1810.08462v1 [cs.CV], IEEE, Oct. 19, 2018, pp. 1-5.
Daudt, Rodrigo Caye, et et., "Urban Change Detection for Multispectral Earth Observation Using Convolutional Neural Networks," arXiv, arXiv:1810.08468v1 [cs.CV], Oct. 19, 2018, pp. 1-4.
De Gregorio, Massimo, et al., "Change Detection with Weightless Neural Networks," IEEE, CVF, Computer Vision Foundation, CVPR2014 Workshop, 2014 IEEE Conference on Computer Vision and Pattern Recognition Workshops, Columbus, OH, USA, Jun. 23-28, 2014, pp. 403-407.
Feng, Yutong, et al., "MeshNet: Mesh Neutral Network for 3D Shape Representation," Association for the Advancement of Artificial Intelligence, Proceedings of the AAAI Conference on Artificial Intelligence, vol. 33, No. 01: AAAI-19, IAAI-19, EAAI-20, Jul. 17, 2019, pp. 1-8.
He, Kaiming, et al., "Deep Residual Learning for Image Recognition," arXiv, arXiv:1512.03385v1 [cs.CV], Dec. 10, 2015, pp. 1-12.
Jampani, Varun, et al., "Learning Sparse High Dimensional Filters: Image Filtering, Sense CRFs and Bilateral Neural Networks," arXiv, arXiv:1503.04949v3 [cs.CV], Nov. 25, 2015, pp. 1-19.
Jiang, Huiwei, et al., "PGA-SiamNet: Pyramid Feature-Based Attention-Guided Siamese Network for Remote Sensing Orthoimagery Building Change Detection," MDPI, Remote Sensing, vol. 12, No. 484, Feb. 3, 2020, pp. 1-21.
Ronneberger, Olaf, et al., "U-Net: Convolutional Networks for Biomedical Image Segmentation," arXiv, arXiv:1505.04597v1 [cs.CV], May 18, 2015, pp. 1-8.
Sakurada, Ken, et al., "Change Detection from a Street Image Pair Using CNN Features and Superpixel Segmentation," BMVA Press, Proceedings of the British Machine Vision Conference (BMVC), BMVC, Swansea, United Kingdom, Sep. 2015, pp. 1-12.
Sakurada, Ken, et al., "Detecting Changes in 3D Structure of a Scene from Multi-view Images Captured by a Vehicle-mounted Camera," IEEE, CVF, Computer Vision Foundation, CVPR2013, 2013 IEEE Conference on Computer Vision and Pattern Recognition, Portland, OR, US, Jun. 23-28, 2013, pp. 137-144.
Sakurada, Ken, et al., "Weakly Supervised Silhouette-based Semantic Scene Change Detection," arXiv, arXiv:1811.11985v2 [cs.CV], Feb. 26, 2020, pp. 1-7.
Shi, Wenzhong, et al., "Change Detection Based on Artificial Intelligence: State-of-the-Art and Challenges," MDPI, Remote Sensing, vol. 12, No. 1688, May 25, 2020, pp. 1-35.
Simonyan, Karen, et al., "Very Deep Convolutional Networks for Large-Scale Image Recognition," arXiv, arXiv:1409.1556v6 [cs.CV], ICLR 2015, Apr. 10, 2015, pp. 1-14.
Stent, Simon, et al., "Detecting Change for Multi-View, Long-Term Surface Inspection," BMVA Press, Proceedings of the British Machine Vision Conference (BMVC), BMVC, Swansea, United Kingdom, Sep. 7-10, 2015, pp. 1-12.
Su, Hang, et al., "SPLATNet: Sparse Lattice Networks for Point Cloud Processing," arXiv, arXiv:1802.08275v4, May 9, 2018, pp. 1-12.
Su, Hang, et al., "Supplementary Material for SPLATNet: Sparse Lattice Networks for Point Cloud Processing," arXiv, arXiv:1802.08275v4 [cs.CV], May 9, 2018, pp. 1-3.
Taneja, Aparna, et al., "City-Scale Change Detection in Cadastral 3D Models Using Images," IEEE, 2013 IEEE Conference on Computer Vision and Pattern Recognition, Portland, OR, USA, Jun. 23-28, 2013, pp. 1-9.
Tomasi, C., et al., "Bilateral Filtering for Gray and Color Images," IEEE, Sixth International Conference on Computer Vision (IEEE Cat. No. 98CH36271), Proceedings of the 1998 IEEE International Conference on Computer Vision, Bombay, India, Jan. 7, 1998, pp. 1-8.
Tran, Thi Huong Giang, et al., "Integrated Change Detection and Classification in Urban Areas Based on Airborne Laser Scanning Point Clouds," MDPI, Sensors, Feb. 3, 2018, pp. 1-21.
U.S. Appl. No. 17/212,884, filed Mar. 25, 2021 by Gregory Demchak et al. for Method and Apparatus for Visually Comparing Geo-Spatially Aligned Digital Content According To Time, pp. 1-28.
U.S. Appl. No. 17/314,735, filed May 7, 2021 by Louis-Philippe Asselin et al. for Classifying Elements and Predicting Properties in an Infrastructure Model Through Prototype Networks and Weakly Supervised Learning, pp. 1-40.
Varghese, Ashley, "ChangeNet: A Deep Learning Architecture for Visual Change Detection," Springer, Cham, SpringerLink, CVF, Computer Vision Foundation, ECCV 2018 Workshop, Computer Vision—ECCV 2018 Workshops, ECCV 2018, Lecture Notes in Computer Science, vol. 11130, Jan. 29, 2019, pp. 1-16.
Wu, Wenxuan, et al., "PointConv: Deep Convolutional Networks on 3D Point Clouds," IEEE, CVF, Computer Vision Foundation, 2019 IEEE/CVF Conference on Computer Vision and Pattern Recognition (CVPR), Long Beach, CA, USA, Jun. 15-20, 2019, pp. 9621-9630.
Zhang, Chi, et al., "Detecting Large-Scale Urban Land Cover Changes from Very High Resolution Remote Sensing Images Using CNN-Based Classification," MDPI, International Journal of Geo-Information, ISPRS, vol. 8, No. 189, Apr. 11, 2019, pp. 1-16.

* cited by examiner

TECHNIQUES FOR DETECTING AND CLASSIFYING RELEVANT CHANGES

BACKGROUND

Technical Field

The present disclosure relates generally to change detection, and more specifically to techniques for detecting and classifying relevant changes between three-dimensional (3D) models.

Background Information

It is increasingly common during the construction and/or operation of infrastructure (e.g., buildings, factories, roads, railways, bridges, electrical and communication networks, equipment, etc.) to create 3D models (e.g., 3D meshes io composed of vertices, edges, and faces). While 3D models may be manually constructed, a number of automated techniques are available that utilize photogrammetry to speed the process. Typically, such photogrammetry-based techniques employ structure-from-motion (SfM) to reconstruct 3D shape based on sets of two-dimensional (2D) source images (e.g., photographs) captured by physical cameras (e.g., digital cameras).

Given the ability to automatically generate 3D models, it is possible to efficiently generate a sequence of 3D models that represent a scene including infrastructure at different points in time. Such a sequence may be helpful for a variety of different use-cases, including construction progress monitoring, infrastructure inspection, and mobile mapping, among others. As part of these applications, software may be called upon to detect relevant changes between different 3D models of the sequence, and classify these changes into categories. In this context, the term "relevant" refers to changes that convey information about performance, status, location, or other qualities that are related to the objectives of the use-case. For example, in a construction progress monitoring use-case, changes indicating progress on construction of infrastructure, or the location of raw materials or construction vehicles on the jobsite, may be considered relevant. Conversely, changes indicating natural events (e.g., differing appearance on sunny days vs cloudy days) or peripheral activities (e.g., pedestrians walking about) may be considered irrelevant.

In the past, attempts have been made to detect and classify changes between different 3D models by comparing geometry of the 3D models and determining distances (e.g., Euclidean distances) between corresponding objects. If a distance exceeds a threshold, a change may be identified. However, techniques involving distance-based comparisons of geometry have suffered a number of shortcomings. First, these techniques typically detect far too many changes that are not relevant. For example, numerous changes due to natural events, peripheral activities, and the like are often identified that io obscure the relevant changes for the particular use case. Second, these techniques are typically unable to detect changes in color or surrounding context. Changes in color of an object or to what surrounds an object may convey relevant information (e.g., regarding progress, performance, status, etc.) even where the geometry of the object of itself remains unchanged. Third, these techniques are often poorly suited for classifying the is changes they may detect. Filters may be employed to attempt of classify changes identified by through distance-based comparisons of geometry, however such filters typically require a user to explicitly identify a type of object to detect and criteria for determining whether an object falls into that type. In some use cases, however, objects may not have readily identifiable types and explicitly specifying criteria may be exceedingly difficult.

There are a number of machine learning techniques that may be used to process 3D models, or data that may be derived from 3D models. Some of these techniques employ only traditional convolutional neural networks (CNNs). Other of these techniques employ sparse lattice networks of bilateral convolution layers (BCLs). Sparce lattice networks take inspiration from permutohedral lattices where convolutions are performed on sparse data in higher-dimensional space. One example of a sparse lattice network is a Sparse Lattice Network for Point Cloud Processing (SplatNet). However, existing CNNs and sparse lattice networks (e.g., SplatNet) have proven inadequate for detecting and classifying relevant changes between 3D models. Among other shortcomings they may require extensive pre-processing which may result in artifacts and loss of natural invariances, may lose some surface information, or may otherwise fail to recognize meaningful information, such that some types of relevant changes are not well detected.

Accordingly, there is a need for improved techniques for detecting and classifying relevant changes between 3D models. Further, it would be useful if such techniques had additional application in the wider field of change detection.

SUMMARY

In various example embodiments, relevant changes between 3D models of a scene including infrastructure at different points in time may be detected and classified by transforming the 3D models into point clouds and applying a deep learning model to the io point clouds. The model may employ a Siamese arrangement of sparse lattice networks, each including a number of modified BCLs. The sparse lattice networks may each take a point cloud as input and extract features in 3D space of the point cloud to provide a primary output with features in 3D space and an intermediate output with features in lattice space. The intermediate output from both sparse lattice networks may be compared is using a lattice convolution layer. The results may then be projected into the 3D space of the point clouds using a slice process and concatenated to the primary outputs of the sparse lattice networks. At this stage, each 3D point in the concatenated output contains information from its point cloud as well as comparison information with respect to other point cloud. Each concatenated output may then be subject to a convolutional network to detect and classify relevant changes. Such techniques may address issues present in existing 3D model change detection techniques. They may also be more widely applicable to change detection between 3D point clouds used for other purposes.

In one specific example embodiment, a software application executing on one or more computing devices receives a pair of 3D point clouds of a scene. The software application applies the point clouds to a trained deep learning model, wherein the trained deep learning model includes a Siamese arrangement of sparse lattice networks that each take a point cloud as input and provide a primary output with features in a 3D space of the point clouds and an intermediate output with features in a lattice space used by the sparse lattice networks. The software application infers relevant changes using the trained deep learning model by comparing the intermediate output from both sparse lattice networks to produce a result, projecting the result into the 3D space of the point clouds, concatenating the result to the primary outputs of each of the sparse lattice networks to produce concatenated outputs with both point cloud-specific and comparison information, and applying the concatenated outputs to a convolutional network. The software application outputs an indication of the detected relevant changes.

It should be understood that a variety of additional features and alternative embodiments may be implemented other than those discussed in this Summary. This Summary is intended simply as a brief introduction to the reader and does not indicate or io imply that the examples mentioned herein cover all aspects of the disclosure or are necessary or essential aspects of the disclosure.

BRIEF DESCRIPTION of the DRAWINGS

The description below refers to the accompanying drawings of example embodiments, of which.

DETAILED DESCRIPTION

Figure 1:
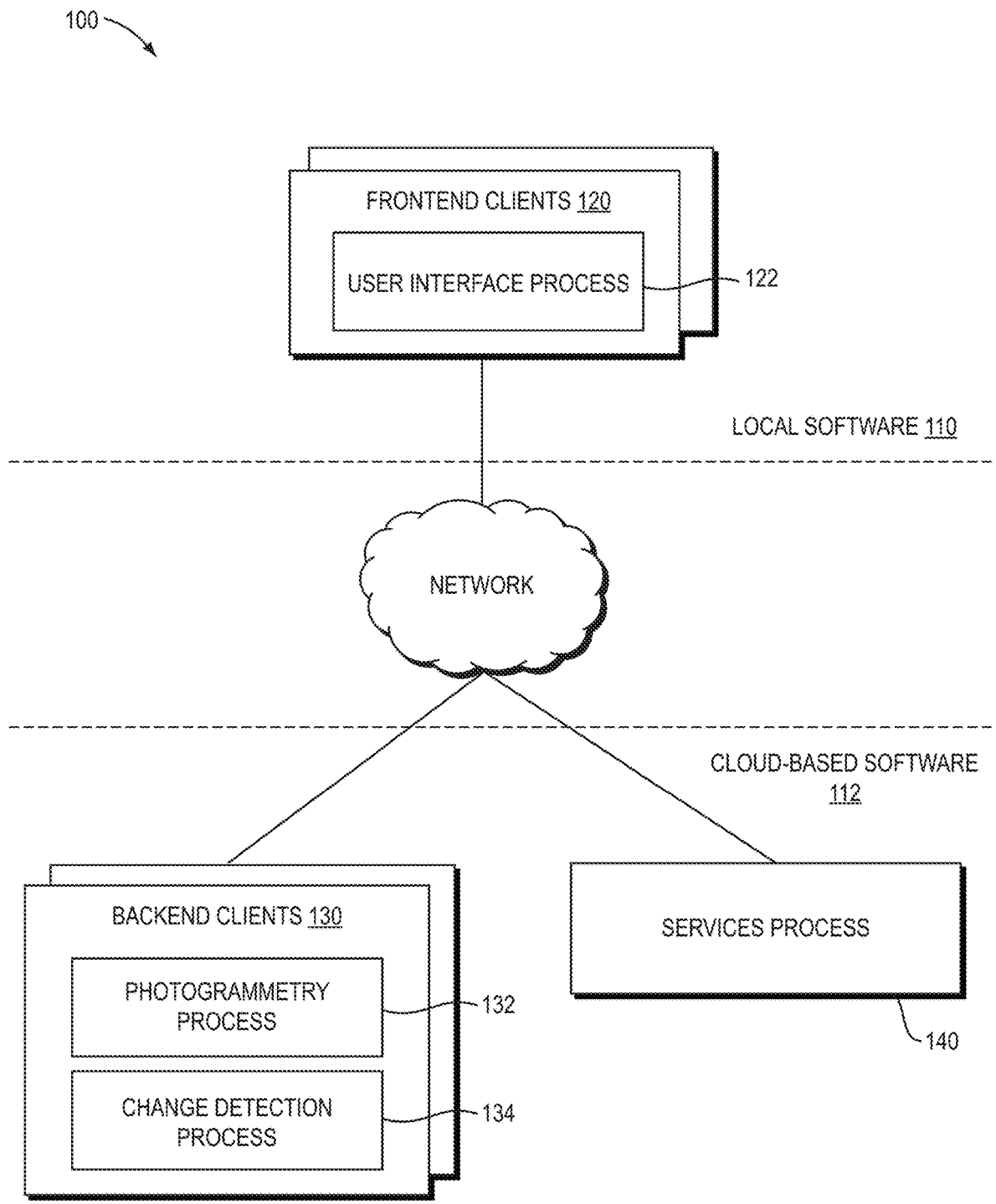
FIG. 1 is a high-level block diagram of an example software architecture for a software application that may implement the techniques described herein.

FIG. 1 is a high-level block diagram of an example software architecture for a software application that may implement the techniques described herein. The application may be the ContextCapture™ program available from Bentley Systems, Inc., the Synchro® 4D program available from Bentley Systems, Inc., a combination of programs (e.g., ContextCapture™ and Synchro® 4D software), or other programs developed by the same or other vendors. The architecture may be divided into local software 110 executing on one or more computing devices arranged locally to an end-user (collectively "local devices"), and cloud-based software 112 executing on one or more computing devices is remote from the end-user ("cloud computing devices"), accessible via a network (e.g., the Internet). Each computing device may include processors, memory/storage, a display screen, and other hardware (not shown) for executing software, storing data and/or displaying information.

The local software 110 may include frontend clients 120, operating on local devices. The frontend clients 120 may be of various types, including desktop clients that operate directly under an operating system and web-based clients that operate within a web browser. The frontend clients 120 may, among a variety of other functionality, provide a user-interface to the application. To that end, each frontend client 120 may include a user interface process 122, among other software processes.

The cloud-based software 112 may include backend clients 130 that operate on cloud computing devices. The backend clients 130 may perform, among a variety of other functions, SfM reconstruction to produce 3D models (e.g., 3D meshes composed of vertices, edges, and faces) of scenes including infrastructure from two-dimensional (2D) source images (e.g., photographs) captured by physical cameras (e.g., digital cameras) at different points in time, and 3D change detection to determine and classify relevant changes between pairs of the 3D models associated with different points in time. To that end, each backend client 130 may include a photogrammetry process 132 and/or a change detection process 134, among other software processes. A services process 140 may functionally organize the application, managing interaction among the clients 120, 130 and their processes.

It should be understood that while a cloud-based processing architecture 100 is shown, a variety of other software architectures may alternatively be employed. For example, a stand-alone architecture may be employed, where user-interface functionality io and processing-intensive operations are all implemented together on one computing device.

In one embodiment, relevant changes between 3D models produced by a photogrammetry process 132 may be detected and classified by a change detection process 134, by transforming the 3D models into 3D point clouds and applying a deep learning model to the point clouds. The deep learning model may be trained under the direction of, and the results presented via, a user interface process 122.

Figure 2:
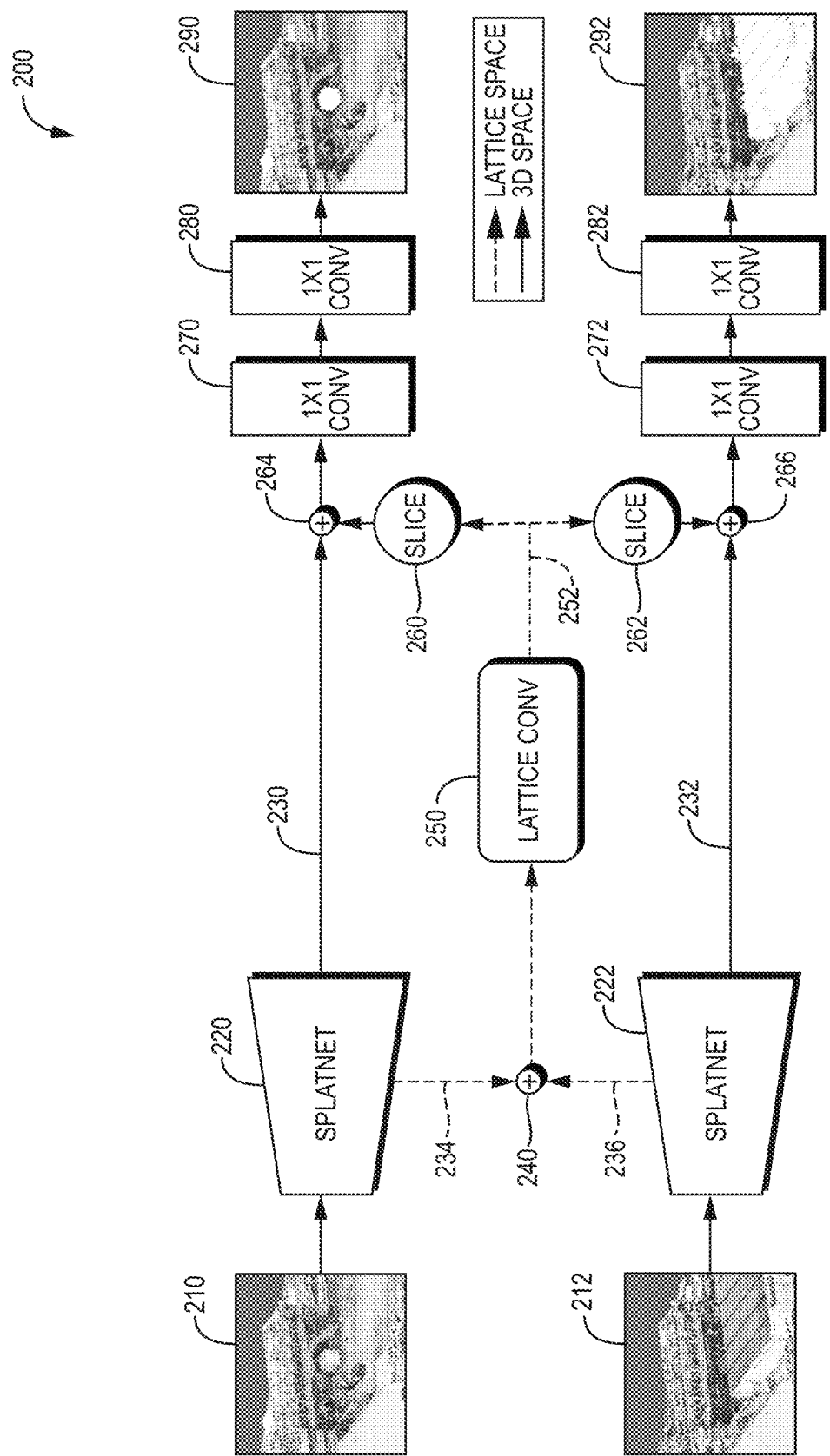
FIG. 2 is a block diagram of an example architecture of a deep learning model that may be implemented by a change detection process to detect and classify differences in 3D point clouds.

FIG. 2 is a block diagram of an example architecture of a deep learning model 200 that may be implemented by the change detection process 134 to detect and classify differences in 3D point clouds. A Siamese arrangement is provided where each branch includes a sparse lattice network 220, 222. Each sparse lattice network 220, 222 takes as input a point cloud 210, 212 (or more specifically, a chunk thereof, as explained further below) corresponding to a different point in time and performs hierarchical and spatially aware learning to produce a primary output 230, 232 in 3D space of the point clouds, as well as an intermediate output 234, 236 in lattice space of the sparse lattice networks. In one implementation, each sparse lattice network 222, 224 is a modified SplatNet that is composed of a number of modified BCLs. BCLs traditionally operate to map input points in 3D space onto a sparse lattice in higher-dimensional space, perform lattice convolutions, and then interpolate the filtered signal back into 3D space. In a traditional SplatNet, the signal in 3D space from a number of BCLs is concatenated together and provided as an output. In a modified SplatNet, in addition to this output, each BCL is modified to provide the filtered signal in lattice space from the lattice convolution. The modified SplatNets provide a plurality of these filtered signals as the intermediate outputs 234, 236. The lattice space of the intermediate outputs 234, 236 is common between the two input point clouds 210, 212 (or more specifically, chunks thereof), with vertices at similar locations, allowing the exchange of information between them.

Figure 3A:
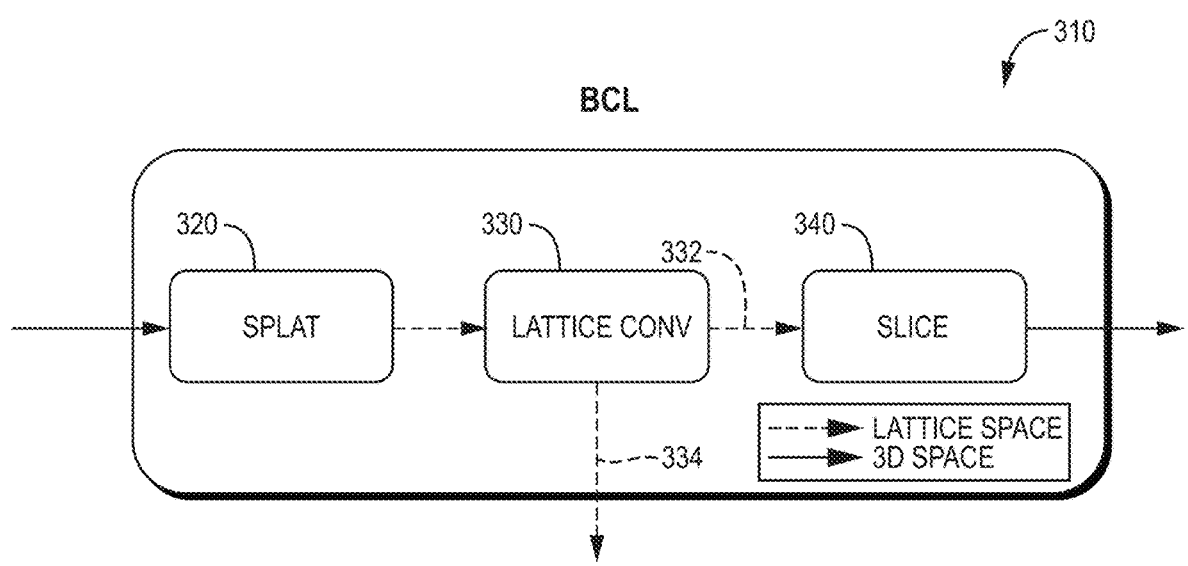
FIG. 3A is an enlarged block diagram of an example modified BCL that may be used in a modified SplatNet.

FIG. 3A is an enlarged block diagram 310 of an example modified BCL that may be used in a modified SplatNet. The modified BCL 310 includes three processes: a splat process 320, a lattice convolution layer 330 and a slice process 340. In the splat process 320, the modified BCL projects input features F in 3D space onto a lattice in $d_1$—dimensional space defined by lattice features L, via barycentric interpolation. The space between lattice points is controlled by scaling lattice features $\Lambda L$, where $\Lambda$ is a diagonal $d_1 \times d_1$ scaling matrix. In the lattice convolution layer 330, once the input points are projected onto the lattice in $d_1$—dimensional space, the modified BCL performs a $d_1$—dimensional convolution on the splatted signal with learnable filter kernels to produce a is filtered response. This filtered response in lattice space is provided, via path 332, to the slice process 340. In addition, the lattice convolution layer 330 is modified to also provide this filtered response in lattice space via path 334, for inclusion in an intermediate output. In the slice process 340, the filtered response from path 332 is projected back into 3D space of the point clouds via barycentric interpolation to produce a response in 3D space.

Figure 3B:
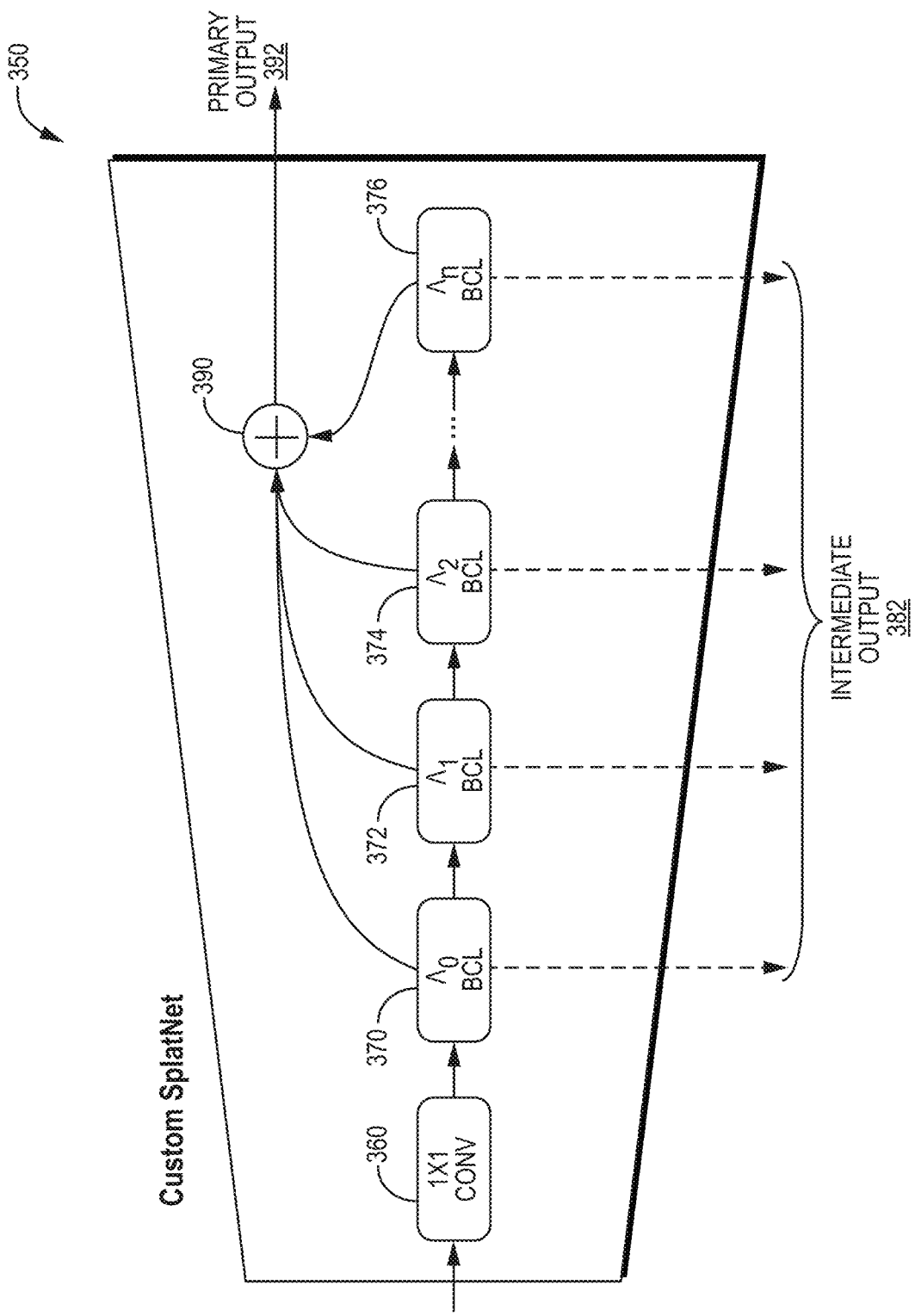
FIG. 3B is a block diagram of an example modified SplatNet that combines a number (e.g., 4) of the modified BCLs of FIG. 3A.

FIG. 3B is a block diagram 350 of an example modified SplatNet that combines a number (e.g., 4) of the modified BCLs of FIG. 3A. The modified SplatNet of FIG. 3B may be used for each sparse lattice network 220, 222 in FIG. 2. The modified SplatNet begins with a single 1×1 convolutional layer 360. The 1×1 convolutional layer 360 processes each input point in 3D space separately without any data aggregation. This is followed by a sequence (e.g., 4) BCLs 370-376 each operating on a lattice. Each BCL in the sequence operates using a different lattice scale, represented by different $\Lambda$. The lattice scale may progress from a given scale $\Lambda_0$ (e.g., corresponding to 2 meters) by dividing the lattice scale by a factor of 2, such that $\Lambda_0, \Lambda_1 = \Lambda_0/2, \Lambda_2 = \Lambda_0/4 \ldots \Lambda_n = \Lambda_0/2^{T-1}$ where T is the number of BCLs. Smaller lattice scale implies coarser lattices and larger receptive fields for the filters. Therefore, deeper BCLs in the sequence have longer range connectivity between input points compared to earlier BCLs. The filtered signal from each modified BCL 370-376 in lattice space at each scale $\Lambda_0$-$\Lambda_n$ is provided as an intermediate output 382. The response in 3D space from each modified BCL 370-376 is provided to a concatenator 390, and the concatenated result provided as a primary output 392.

Returning to FIG. 2, the intermediate outputs 234, 236 in lattice space are concatenated by concatenator 240 to aggregate features from the two point clouds 210, 212 (or more specifically, chunks thereof). In an implementation where the sparse lattice networks 220, 222 are modified SplatNets, the intermediate outputs 234, 236 include the io filtered signal in lattice space at each scale $\Lambda_0$-$\Lambda_n$, so the concatenation includes multiple individual concatenations for each of the lattice scales, such that (signal $\Lambda_0$+signal $\Lambda_0$) (signal $\Lambda_1$+signal $\Lambda_1$) . . . (signal $\Lambda_n$+signal $\Lambda_n$). The resulting concatenation of features in lattice space is provided to a lattice convolution layer 250 that compares the features.

Figure 4:
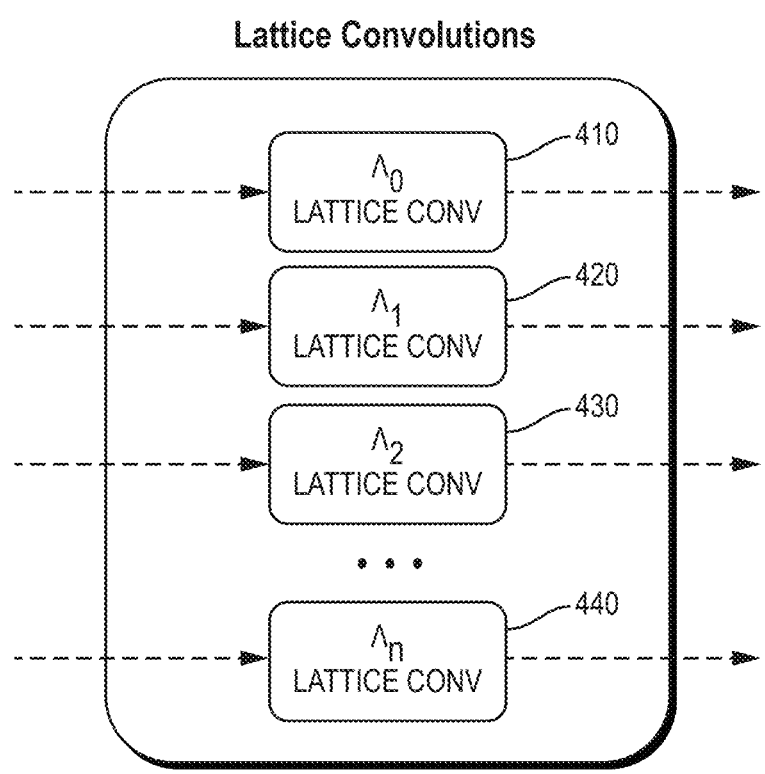
FIG. 4 is a block diagram of example lattice convolution sublayers that may be performed by a lattice convolution layer of FIG. 2.

FIG. 4 is a block diagram of example lattice convolution sublayers 410-440 that may be performed by the lattice convolution layer 250 of FIG. 2. Each lattice convolution sublayer 410-440 receives as input the concatenated signal for the same lattice scale $\Lambda_0, \Lambda_1 \ldots \Lambda_n$. The concatenated features at each lattice scale are then filtered by lattice convolution sublayer 410-440 and provided as a series of filtered concatenated outputs in lattice space.

Returning to FIG. 2, filtered concatenated output 252 from the lattice convolution layer 250 is projected into the 3D space of each of the point clouds using a respective slice process 260, 262.

Figure 5:
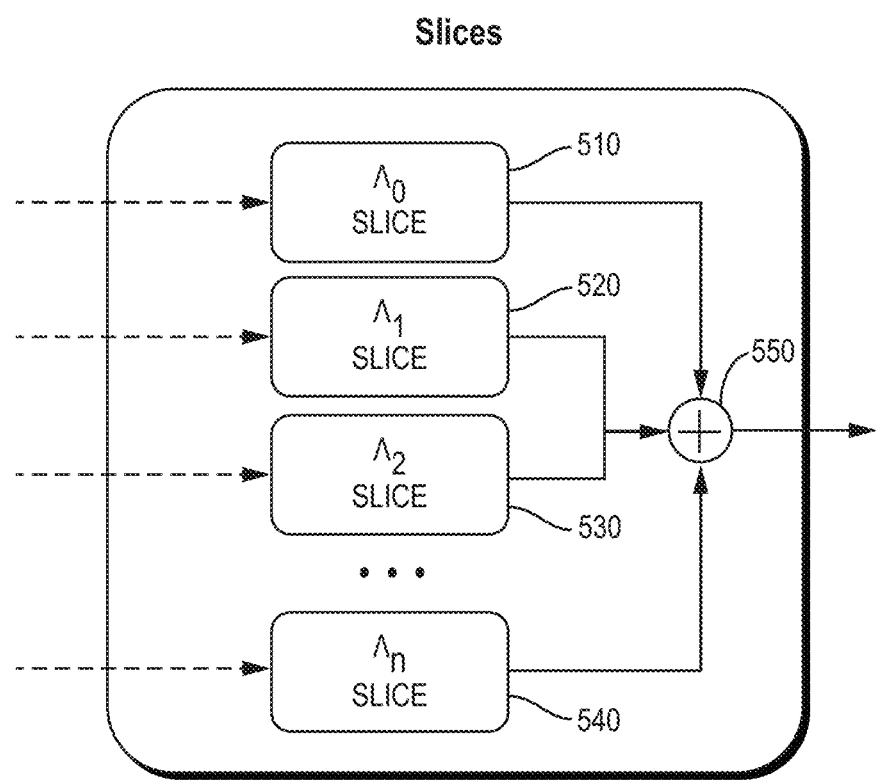
FIG. 5 is a block diagram of example slices subprocess that may be performed by slice processes of FIG. 2.

FIG. 5 is a block diagram of example slices subprocess 510-540 that may be performed by slice processes 260, 262 of FIG. 2. Each slice subprocess 510-540 receives as input the filtered concatenated signal for the same lattice scale $\Lambda_0, \Lambda_1 \ldots \Lambda_n$. The filtered concatenated features at each lattice scale are then projected back into 3D space of the point clouds via barycentric interpolation. The projections for each lattice scale $\Lambda_0, \Lambda_1 \ldots \Lambda_n$ are then concatenated by concatenator 550 and provided as a comparison output in 3D space.

Returning to FIG. 2, the comparison output in 3D space of the point clouds from each slice process 260, 262 is then concatenated to the primary outputs 230, 232 of the sparse lattice networks in 3D by a concatenator 264, 266. After this, each concatenated output includes 3D point information from its point cloud as well as comparison information with respect to the other point cloud. The concatenated output with both point cloud-specific and comparison information is then subject to a convolutional network to detect and classify relevant changes. In one implementation, the convolutional io network includes a 1×1 convolutional layer 270, 272 that performs filtering and one or more additional 1×1 convolutional layer 280, 282 that predict and classify changes to produce final outputs 290, 292. The final outputs 290, 292 may take the form of point clouds (or more specifically, chunks thereof) that indicate (e.g., by highlighting) relevant changes and associate (e.g., with labels or other metadata) each relevant change with a category reflecting the type of change.

The weights used in the layers of the deep learning model 200 of FIG. 2 may be trained by evolving candidate solutions (i.e., sets of weights) to minimize a loss function. One loss function that may be utilized is a categorical cross entropy (CCE) loss function that seeks to minimize the difference between the model's predicted probability distribution given a training dataset and the actual distribution of probabilities in the training dataset. An example CCE loss function may be given as:

$$CCE(p, t) = -\sum_{c=1}^{C} t_c \log p_c$$

where c is a class in a set of all classes C (e.g., a category of relevant changes of all relevant changes), $p_c$ is the predicted probability of being of the class c, and $t_c$ is the actual probability of being of the class c.

Figure 6:
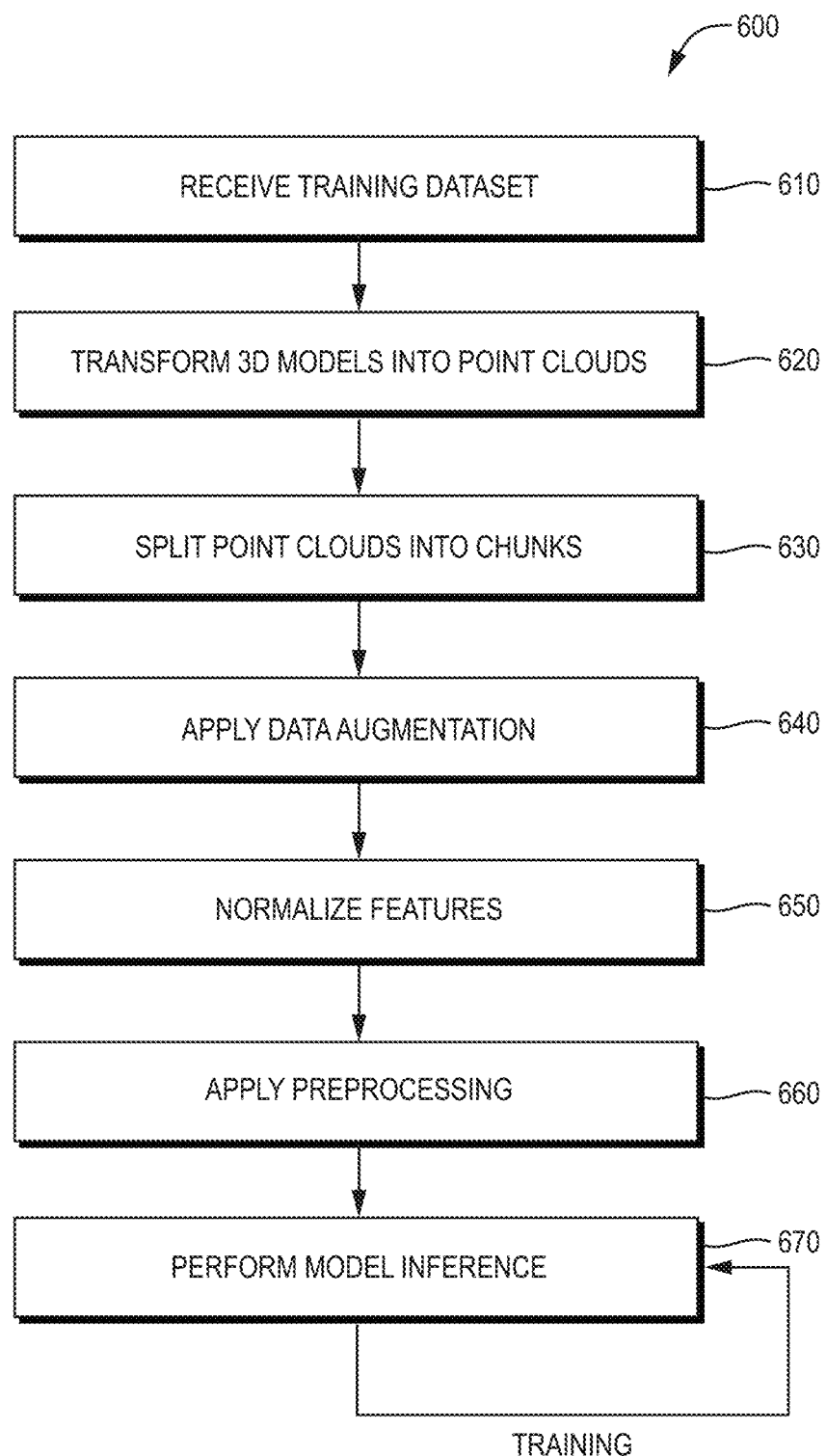
FIG. 6 is a flow diagram of an example sequence of steps that may be used by a change detection process to train the deep learning model of FIG. 2.

FIG. 6 is a flow diagram of an example sequence of steps 600 that may be used by a change detection process 134 to train the deep learning model 200 of FIG. 2. At step 610, the change detection process 134 receives a training dataset that includes pairs of 3D models that represent scenes that include infrastructure at different points in time. The 3D models in the training dataset may have been reconstructed by a photogrammetry process 132 using SfM from 2D source images captured by physical cameras and then manually annotated to indicate actual relevant changes and categories thereof. Alternatively, the 3D models in the training dataset may have been produced and annotated using other techniques. At step 620, the pairs of 3D models in the training dataset are transformed into pairs of point clouds (e.g., by point sampling or other techniques). At step 630, each pair of point clouds is split into a plurality of chunks that each occupy a smaller region of 3D space. The point clouds of a pair may be split upon a same 3D grid or upon other same boundaries, to create a series of pairs of chunks that correspond in size and location with each other. The number of chunks each pair of point clouds is split into may be selected based on available memory resources to avoid memory saturation. At step 640, data augmentation is applied to increase the size of the training dataset. The data is augmentation may include duplicating pairs of chunks with geometric and/or colorimetric transforms to produce additional chunks that include different combinations of features. At step 650, features in each chunk of the training dataset are normalized. Normalization may serve to ensure different types of features are given equal (or more equal) importance so that no single type of feature unduly steers model performance. At step 660, preprocessing is applied to each pair of chunks of the training dataset. The preprocessing may include computing positions, initial weights, and connectivity across points (i.e., filter neighborhoods) for the lattices used in the deep learning model 200. At step 670, each preprocessed pair of chunks is applied to the deep learning model 200 and relevant changes and categories thereof are inferred. Such inference is repeated through a series of training iterations, where the predicted relevant changes and categories thereof are compared to the annotations of actual relevant changes and categories thereof, and candidate solutions (i.e., sets of weights) are evolved to minimize a loss function (e.g., a CCE loss function). A gradient descent optimization algorithm may be used to evolve the candidate solutions. Alternatively, another type of optimization algorithm may be used. Training may continue until a stopping condition is reached indicating the loss function has likely been minimized (e.g., norm of the gradient is below a threshold, a max number of iterations has been reached, generalization error begins to increase, etc.). The final candidate solutions (i.e., sets of weights) are then utilized to produce a trained deep learning model 200 that may be used in prediction.

Figure 7:
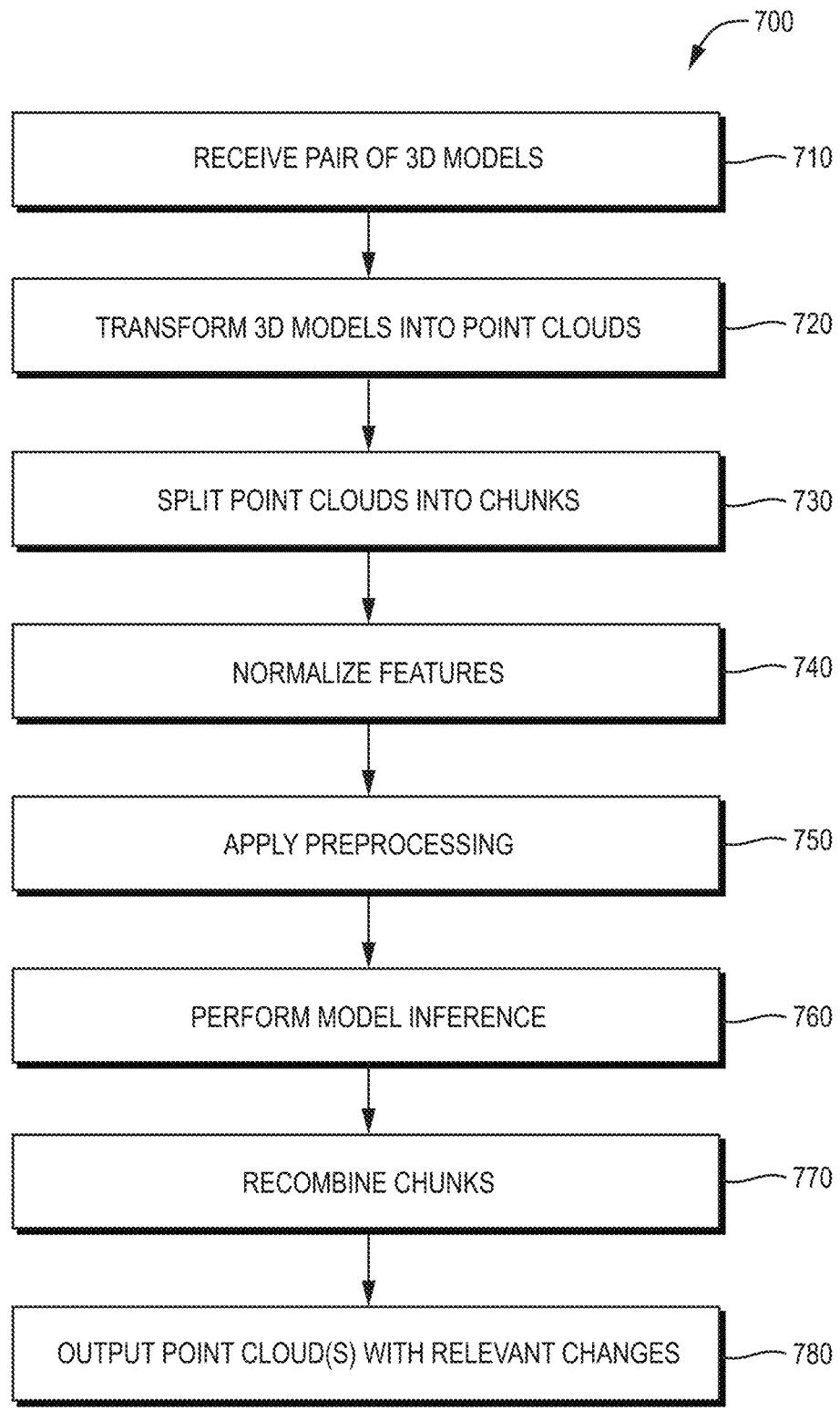
FIG. 7 is a flow diagram of an example sequence of steps that may be used by a change detection process to use a trained deep learning model of FIG. 2 to predict relevant changes and categories thereof.

FIG. 7 is a flow diagram of an example sequence of steps 700 that may be used by a change detection process 134 to use a trained deep learning model 200 of FIG. 2 to predict relevant changes and categories thereof. At step 710, the change detection process 134 receives a pair of 3D models that represent a scene that includes infrastructure at different points in time. The 3D models may have been reconstructed by a photogrammetry process 132 using SfM from 2D source images captured by physical cameras. At step 720, the pair of 3D models is transformed into a pair of point clouds (e.g., by point sampling or other techniques). At step 730, the pair of point clouds is split into a plurality of chunks that each occupy a smaller region of 3D space. The point clouds of a pair may be split upon a same 3D grid or upon other same boundaries, to create a series of pairs of chunks that correspond in size and location with each other. The number is of chunks may be selected based on available memory resources to avoid memory saturation. At step 740, features in each chunk of the pair of point clouds are normalized. At step 750, preprocessing is applied to each pair of chunks of the pair of point clouds. The preprocessing may include computing positions and connectivity across points (i.e., filter neighborhoods) for the lattice used by the trained deep learning model 200. At step 760, each preprocessed pair of chunks of the pair of point clouds is applied to the trained deep learning model 200 and relevant changes and categories thereof are inferred. Relevant changes may be visually indicated (e.g., by highlighting) and categories associated therewith (e.g., by labels or other metadata). At step 770, the chunks of each point cloud including the relevant changes and categories thereof may be recombined to produce point clouds with classified relevant changes. At step 780, one or both of the point clouds with classified relevant changes are output (e.g., displayed to a user in a user interface, stored to memory/storage, provided to another software application etc.).

It should be understood that a wide variety of adaptations and modifications may be made to the techniques. While specific example software and hardware is discussed above, it should be understood that the techniques may be implemented using a variety of different types of software, hardware, and combination thereof. Such software may include executable instructions stored in a non-transitory computing device-readable medium, such as a volatile or persistent memory device, a hard-disk, or other data storage. Such hardware may include a variety of types of processors, memory chips, programmable logic circuits, application specific integrated circuits, and/or other types of hardware components that support execution of software. Combinations of software and hardware may be adapted to suit different environments and applications. Above all, it should be understood that the above descriptions are meant to be taken only by way of example.

What is claimed is:

1. A method for detect relevant changes, comprising:
   receiving, by a software application executing on one or more computing devices, a pair of three-dimensional (3D) point clouds of a scene;
   applying the point clouds to a trained deep learning model of the software application, wherein the trained deep learning model includes a Siamese arrangement of sparse lattice networks that each take a point cloud as input and provide a primary output with features in a 3D space of the point clouds and an intermediate output with features in a lattice space used by the sparse lattice networks;
   inferring relevant changes using the trained deep learning model by
      comparing the intermediate output from both sparse lattice networks to produce a result,
      projecting the result into the 3D space of the point clouds,
      concatenating the result to the primary outputs of each of the sparse lattice networks to produce concatenated outputs with both point cloud-specific and comparison information, and
      applying the concatenated outputs to a convolutional network; and
   outputting, by the software application, an indication of the detected relevant changes.

2. The method of claim 1, wherein the inferring further classifies the detected relevant changes into one or more categories using the trained deep learning model.

3. The method of claim 1, wherein each sparse lattice network includes a plurality of modified bilateral convolution layers (BCLs) that each provide a respective response in the 3D space of the point clouds and a respective response in the lattice space of the sparse lattice networks, and the intermediate output includes a plurality of responses in the lattice space.

4. The method of claim 3, wherein each modified BCL uses a different lattice scale and the plurality of responses in the lattice space of the intermediate outputs include a response in lattice space at each of the different lattice scales, and wherein the comparing and the projecting are performed at each of the different lattice scales.

5. The method of claim 1, wherein the comparing is performed using a lattice convolution layer that filters the output from both sparse lattice networks and produces a filtered concatenated output in lattice space.

6. The method of claim 1, wherein the projecting is performed by a pair of slice processes using barycentric interpolation, and the result from each slice process includes both point cloud-specific and comparison information which is concatenated to a respective one of the primary outputs of a respective one of the sparse lattice networks.

7. The method of claim 1, wherein the convolutional network includes a convolutional layer that performs filtering and one or more additional convolutional layer that predict the detected relevant changes.

8. The method of claim 1, wherein the pair of 3D point clouds are point clouds that represent the scene at different points in time.

9. The method of claim 1, further comprising:
receiving a pair of 3D models of the scene that include the infrastructure at the different points in time; and
transforming the pair of 3D models into the pair of 3D point clouds.

10. The method of claim 1, wherein the indication of the detected relevant changes includes a pair of point clouds with indications of relevant changes, and the outputting includes displaying at least one of the pair of point clouds with indications of relevant changes in a user interface of the software application, storing at least one of the pair of point clouds with indications of relevant changes to memory/storage of the one or more computing devices or providing at least one of the pair of point clouds with indications of relevant changes to another software application.

11. A computing device comprising:
a processor; and
a memory coupled to the processor and configured to store software for a change detection process, the change detection process when executed on the processor configured to:
receive a pair of three-dimensional (3D) point clouds of a scene,
apply the point clouds to a trained deep learning model, wherein the trained deep learning model employs a Siamese arrangement of sparse lattice networks that each take a point cloud as input and provide a primary output with features in a 3D space of the point clouds and an intermediate output with features in a lattice space used by the sparse lattice networks,
infer relevant changes by the trained deep learning model using a concatenated output that includes both point cloud-specific and comparison information, the concatenated output produced from the primary output of at least one sparse lattice network and a result of a comparison between the intermediate output from both sparse lattice networks, and
output an indication of the detected relevant changes.

12. The computing device of claim 11, wherein the change detection process when executed on the processor is configured to classify the detected relevant changes into one or more categories using the trained deep learning model.

13. The computing device of claim 11, wherein the change detection process when executed on the processor is configured to use the concatenated output by projecting the result of the comparison into the 3D space of the point clouds, concatenating the result of the comparison to the primary outputs of the sparse lattice networks to produce the concatenated output with both point cloud-specific and comparison information, and apply the concatenated output to a convolutional network.

14. The computing device of claim 11, wherein each sparse lattice network includes a plurality of modified bilateral convolution layers (BCLs) that each provide a respective response in the 3D space of the point clouds and a respective response in the lattice space of the sparse lattice networks.

15. A non-transitory computing device readable medium having instructions stored thereon, the instructions when executed by one or more computing devices operable to:
receive a pair of three-dimensional (3D) point clouds of a scene;
apply the point clouds to a trained deep learning model, wherein the trained deep learning model employs a Siamese arrangement of sparse lattice networks that each take a point cloud as input and provide a primary output with features in a 3D space of the point clouds and an intermediate output with features in a lattice space used by the sparse lattice networks;
infer relevant changes by the trained deep learning model using a concatenated output that includes both point cloud-specific and comparison information, the concatenated output produced from the primary output of a sparse lattice network and a result of a comparison between the intermediate output from both sparse lattice networks; and
output an indication of the detected relevant changes.

16. The non-transitory computing device readable medium of claim 15, wherein the instructions operable to infer relevant changes further comprise instructions that when executed are operable to:
project the result of the comparison into the 3D space of the point clouds;
concatenate the result of the comparison to the primary outputs of the sparse lattice networks to produce the concatenated output with both point cloud-specific and comparison information; and
apply the concatenated output to a convolutional network.

17. The non-transitory computing device readable medium of claim 16 wherein the instructions operable to infer relevant changes further comprise instructions that when executed are operable to:
perform comparisons using a lattice convolution layer that filters the output from both sparse lattice networks and produces a filtered concatenated output in lattice space.

18. The non-transitory computing device readable medium of claim 16 wherein the instructions operable to infer relevant changes further comprise instructions that when executed are operable to:
perform projections of the concatenated output that includes both point cloud-specific and comparison information using a slice process that implements barycentric interpolation, wherein the result from the slice process is concatenated to the primary output of the sparse lattice network.

19. The non-transitory computing device readable medium of claim 15, wherein each sparse lattice network includes a plurality of modified bilateral convolution layers (BCLs) that each provide a respective response in the 3D space of the point clouds and a respective response in the lattice space.

20. The non-transitory computing device readable medium of claim 19, wherein each modified BCL uses a different lattice scale and the plurality of responses in lattice space of the intermediate outputs include a response in lattice space at each of the different lattice scales, and wherein the comparison is performed at each of the different lattice scales.

* * * * *

UNITED STATES PATENT AND TRADEMARK OFFICE
CERTIFICATE OF CORRECTION

| | |
|---|---|
| PATENT NO. | : 11,645,784 B1 |
| APPLICATION NO. | : 17/394644 |
| DATED | : May 9, 2023 |
| INVENTOR(S) | : Christian Xu et al. |

It is certified that error appears in the above-identified patent and that said Letters Patent is hereby corrected as shown below:

On the Title Page

Item (57) Line 14:
"enated to the primary io outputs of the sparse lattice net-"
Should read:
-- enated to the primary outputs of the sparse lattice net- --

In the Specification

Column 1, Line 16:
"equipment, etc.) to create 3D models (e.g., 3D meshes io"
Should read:
-- equipment, etc.) to create 3D models (e.g., 3D meshes --

Column 1, Line 55:
"identified that io obscure the relevant changes for the"
Should read:
-- identified that obscure the relevant changes for the --

Column 1, Line 62:
"are often poorly suited for classifying the is changes they"
Should read:
-- are often poorly suited for classifying the changes they --

Column 2, Line 33:
"a deep learning model to the io point clouds. The model may"
Should read:
-- a deep learning model to the point clouds. The model may --

Signed and Sealed this
First Day of April, 2025

Coke Morgan Stewart
*Acting Director of the United States Patent and Trademark Office*

CERTIFICATE OF CORRECTION (continued)
U.S. Pat. No. 11,645,784 B1

Column 2, Line 41:
"is using a lattice convolution layer. The results may then be"
Should read:
-- using a lattice convolution layer. The results may then be --

Column 3, Line 9:
"does not indicate or io imply that the examples mentioned"
Should read:
-- does not indicate or imply that the examples mentioned --

Column 3, Line 57:
"is remote from the end-user ("cloud computing devices"),"
Should read:
-- remote from the end-user ("cloud computing devices"), --

Column 4, Line 24:
"interface functionality io and processing-intensive opera-"
Should read:
-- interface functionality and processing-intensive opera- --

Column 5, Line 7:
"kernels to produce a is filtered response. This filtered"
Should read:
-- kernels to produce a filtered response. This filtered --

Column 5, Line 44:
"the intermediate outputs 234, 236 include the io filtered"
Should read:
-- the intermediate outputs 234, 236 include the filtered --

Column 6, Line 16:
"volutional io network includes a 1 × 1 convolutional layer"
Should read:
-- volutional network includes a 1 × 1 convolutional layer --

Column 7, Line 1:
"is augmentation may include duplicating pairs of chunks"
Should read:
-- augmentation may include duplicating pairs of chunks --

Column 7, Line 48:
"number is of chunks may be selected based on available"
Should read:
-- number of chunks may be selected based on available --